Dec. 30, 1930.                J. D. NIES                 1,786,772
                         MOTOR CONTROL MEANS
                   Filed Oct. 6, 1928        2 Sheets-Sheet 1
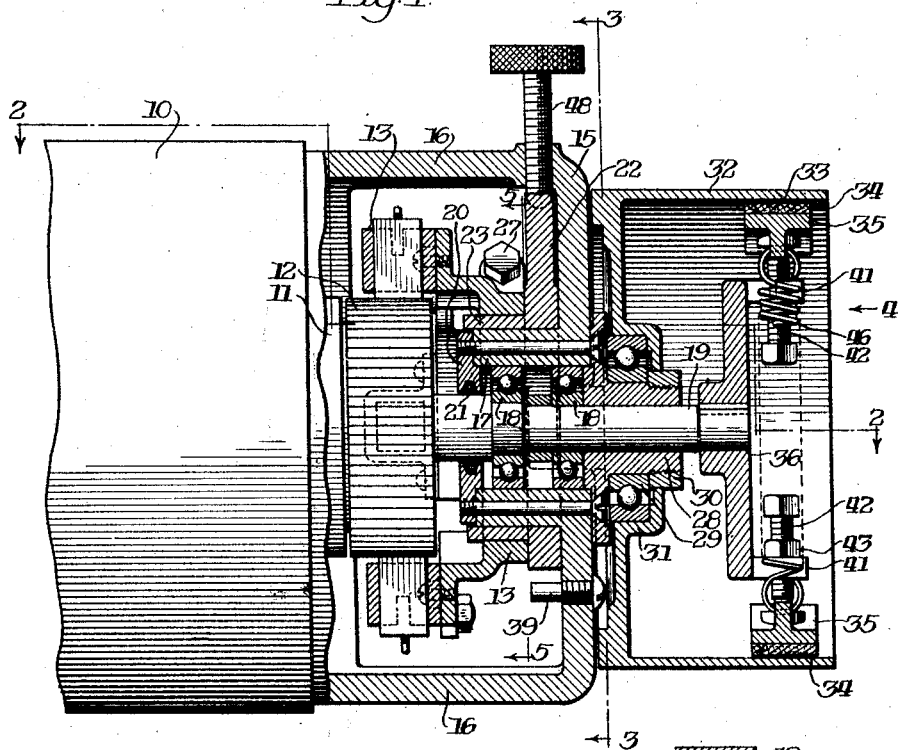
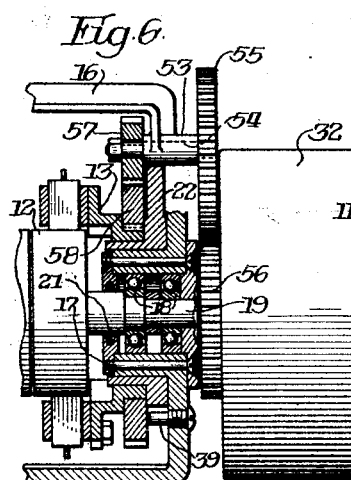
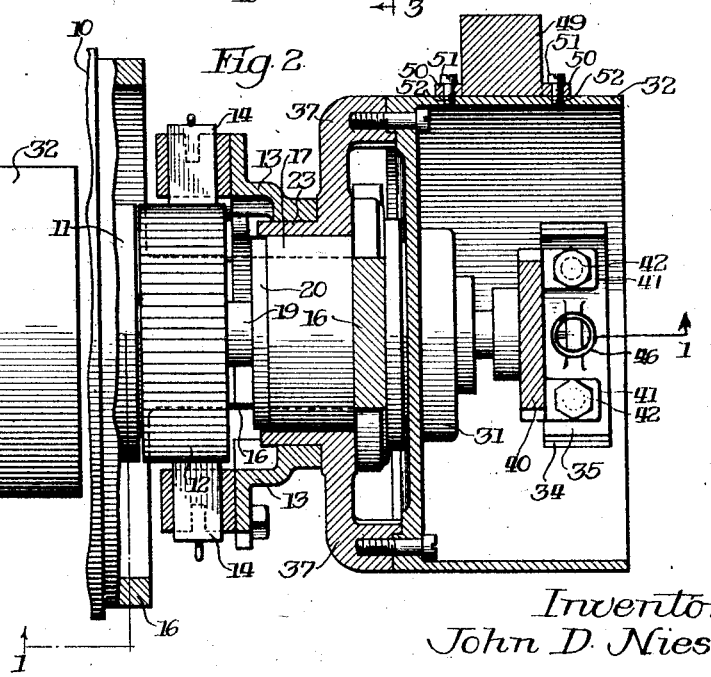
Inventor:
John D. Nies.
By Wilkinson, Huxley, Byron & Knight Dec. 30, 1930.   J. D. NIES   1,786,772
MOTOR CONTROL MEANS
Filed Oct. 6, 1928   2 Sheets-Sheet 2
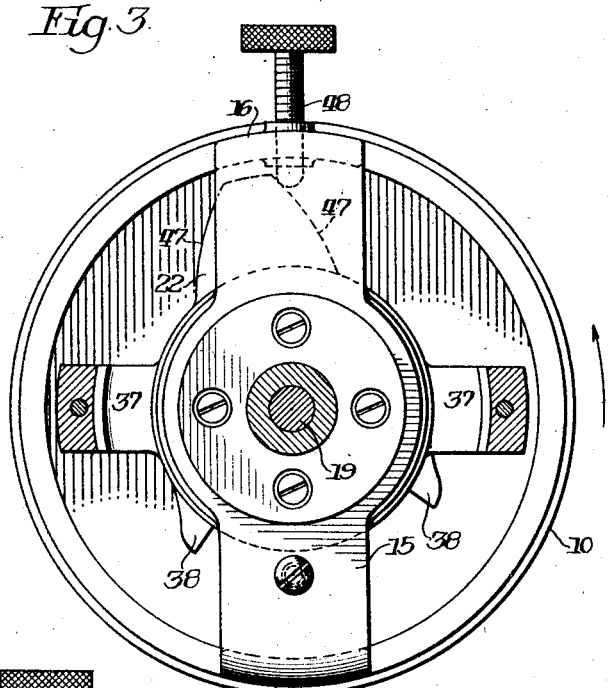
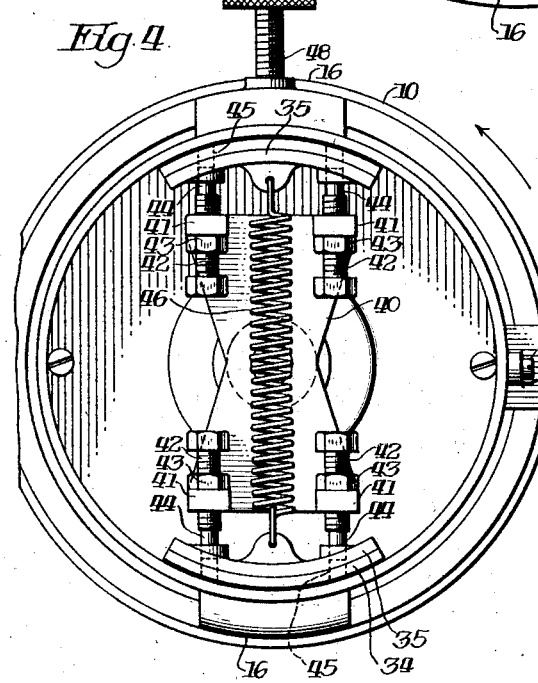
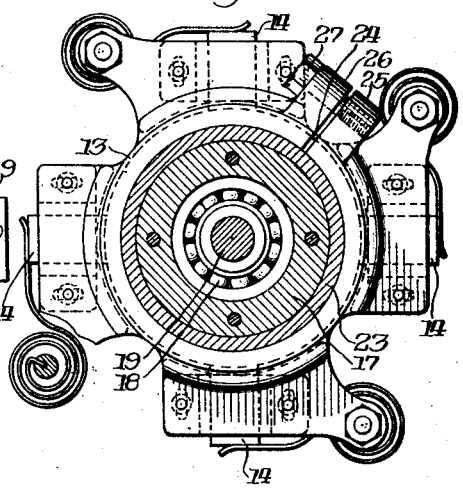
Inventor:
John D. Nies Patented Dec. 30, 1930

1,786,772

UNITED STATES PATENT OFFICE

JOHN D. NIES, OF CHICAGO, ILLINOIS, ASSIGNOR TO KIMBLE ELECTRIC COMPANY, OF CHICAGO, ILLINOIS, A CORPORATION OF ILLINOIS

MOTOR-CONTROL MEANS

Application filed October 6, 1928. Serial No. 310,690.

The present invention relates to motor control means.

In the manufacture of certain articles it is common practice to operate a driving motor continuously, the operator manipulating a clutch for connecting said motor to a tool. An example of such work is the manufacture of pasteboard boxes, wherein it is common practice for the operator to control mechanism for clutching a box forming die to a motor for communicating power to said die, the die being declutched from the motor between forming operations.

As will appear further hereinafter, the present invention is particularly applicable to the type of motor having series characteristics. As is well known, when the load is thrown off such a motor the speed tends to rise very materially, sometimes to a dangerous extent.

An object of the present invention is to provide control mechanism for an electric motor having series characteristics which will cause said motor to operate at a certain predetermined speed while under load and which will limit said speed to a predetermined higher value when the load is removed.

A further object is to provide motor control means which is particularly well adapted for service in which a load is intermittently applied to a continuously operating motor.

A further object is to provide motor control means of the kind immediately above referred to, which utilizes to good advantage the inertia of the rotor of a motor when the load is applied to said motor.

A further object is to provide control means for a motor having series characteristics, which means is convenient and reliable, for controlling the speed of said motor at different values under load and no load conditions.

A further object is to provide motor control means of the kind above referred to which has the advantage that the speeds to be controlled may be readily set.

A further object is to provide control means for a motor having series characteristics, which meets the needs of commercial operation, as in service involving intermittently applied loads.

Further objects will appear as the description proceeds.

Referring to the drawings—

Figure 1 is a view in side elevation of a motor, parts being broken away along the vertical axial plane of said motor to illustrate certain features embodying the present invention;

Figure 2 is a horizontal sectional view taken along the plane indicated by the arrows 2—2 Figure 1;

Figure 3 is a sectional view taken along the plane indictated by the arrows 3—3 of Figure 1;

Figure 4 is an end view of the structure shown in Figure 1, said view being taken in the direction of the arrow 4 of Figure 1;

Figure 5 is a sectional view taken along the plane indicated by the arrows 5—5 of Figure 1; and Figure 6 is a view similar in many respects to Figure 1, but showing a slight modification.

Before proceeding with a detailed explanation of the illustrated embodiment of the present invention, it may be well to state that the present invention contemplates novel control means which will allow an electric motor to operate at a certain set speed while under load and which will limit said speed to a predetermined higher value when the load is removed, as for example when the load is declutched from said motor. The operation just referred to has very important advantages from a commercial standpoint, inasmuch as the higher speed under no load permits better utilization of the inertia of the motor in setting in operation the tool, such for example as a box forming die or other mechanism. If it were not for the relatively high speed obtained under no load conditions, the burden placed upon the motor in starting said tool from rest would cause a considerable fall in speed below the normal operating speed.

Referring particularly to alternating current commutator motors, the speed may, as is well known, be controlled by controlling the positions of the brushes relative to the axis of the stator winding. When the brushes are in angular position relative to the stator winding, the rotor of the motor is caused to rotate. The highest speed is attained at a certain brush setting. Shifting of the brushes in the direction of rotation has the effect of cutting down the speed. The present invention contemplates means applicable to motors having series characteristics, and particularly alternating current motors of the commutator type, for shifting the brushes when the motor speed has risen above the normal working speed to a higher predetermined speed, which may be termed a "predetermined limiting speed". The rise in speed referred to would in ordinary circumstances be caused by the declutching of the motor from the tool, such for example as a box forming die, with which it is associated.

The numeral 10 indicates the housing of an electric motor, which may be, for example, an alternating current commutator motor of either single phase or polyphase. Rotatably disposed within the housing 10 is the rotor 11 having the commutator 12 fixed thereto. Cooperatively associated with the commutator 12 is the brush holder 13, which, as illustrated in Figure 5, holds four brushes 14—14 in cooperative relationship with said commutator 12. The present invention contemplates, as will appear more particularly hereinafter, a convenient structure by means of which the initial setting of said brushes for any predetermined speed may be conveniently adjusted and whereby said brushes will be shifted automatically under service conditions.

Secured to one extremity of the housing 10 is a yoke 15 comprising the two arms 16—16 diametrically disposed relative to one another and the bearing ring 17 supported by said arms 16—16. Said bearing ring 17 houses a pair of ball bearings 18—18, which support the shaft 19 at one extremity of the rotor 11. The other extremity of the rotor 11 may be rotatably supported by any preferred means (not illustrated). Said bearing ring 17 is provided at its inner extremity with the cap 20, bolted or otherwise secured to said bearing ring, which cap is provided with a felt washer 21 for preventing the passage of lubricant from the ball bearings 18—18 to the region of the commutator 12.

Rotatably disposed upon the bearing ring 17 and in bearing relationship therewith is the cam member 22, which cam member has a cylindrical boss 23 extending therefrom providing a relatively broad bearing surface for engagement with the bearing ring 17. The brush holder 13 is clamped to the boss 23 by means of structure which will now be described.

Referring to Figure 5, it will be noted that the brush holder 13 comprises a split ring, the split in said ring being indicated by the numeral 24. Said brush holder 13 is provided with a pair of bosses 25 and 26 located at its extremities adjacent to the split 24. Said boss 25 is screw-threaded, and a cap screw 27 is threaded therein, said cap screw having a head adapted to engage the boss 26. It will be understood without further explanation that by loosening up upon the cap screw 27 the brush holder 13 may be loosened from the boss 23 and adjusted to desired positions circumferentially of said boss 23. By tightening up upon said cap screw 27 the brush holder 13 will be non-rotatably secured to said boss 23, whereby said brush holder 13 will move as a unit with the cam member 22.

By reference to Figure 1, it will be noted that the yoke 15 has secured at its outer extremity the annular member 28, which limits outward movement of the outer ball bearing 18 and also provides a support for a ball bearing 29. Said annular member 28 is screw-threaded for the reception of a nut 30, which limits outward movement of said ball bearing 29. Located upon the outer race of said ball bearing 29 is a cup-shaped member 31, which supports the drum 32. Said drum 32 has a finished inner peripheral surface 22 adapted to be engaged by the linings 34—34 of a pair of shoes 35, which shoes, as will be explained presently, are part of a centrifugal device, indicated as a whole by the numeral 36, which centrifugal device 36 is non-rotatably secured to the shaft 19 driven by the rotor 11. Said drum 32 is connected to the cam member 22 by means of arms 37—37, which, as indicated in Figure 2, are secured to the drum 32. Said arms 37—37 are disposed between the arms 16—16 of the yoke 15. No interference is had in the operation of the described embodiment of the present invention between the arms 37—37 and the arms 16—16, by reason of the fact that the drum 32 rotates through an arc considerably less than 180 degrees. By reference to Figure 3 it will be noted that the cam member 22 is provided with a pair of horns 38—38 spaced from one another. Projecting inwardly from the lower arm 16 of the yoke 15 is the pin 39, which limits swinging movement of the cam member 22 by reason of this engagement with one or the other of said horns 38—38.

The centrifugal device 36 will be clear from an inspection of Figures 1 and 4. It will be noted that the shaft 19 has non-rotatably secured thereto the plate or bar 40 provided at each of its extremities with a pair of bosses 41—41. Said bosses 41—41 are screw-threaded for the reception of threaded bolts 42—42, which bolts may be locked in position by means of the lock nuts 43—43. The projecting extremities of the bolts 42—42 are of plain cylindrical contour, as indicated by the numerals 44—44. Said cylindrical extremities 44 are adapted to fit within corresponding apertures 45—45 within the shoes 35—35. Said shoes 35—35 are urged inwardly, that is—toward the axis of the shaft 19, by means of the spring 46, inward movement of said shoes being limited by the pins 42—42.

By reference to Figure 3 it will be noted that the cam member 22 has a pair of cam surfaces 47—47. Disposed within the upper arm 16 of the yoke 15 is the thumbscrew 48, having an extremity adapted to contact with one or the other of the cam surfaces 47—47. It will be clear without detailed explanation that by changing the setting of the thumbscrew 48 the limit of circumferential movement of the cam member 22 may be adjusted. It will be understood, further, that the parts may be so positioned that the extremity of the thumbscrew 48 will engage either of the surfaces 47—47 of the cam member 22, the choice depending upon the direction of rotation of the rotor 11. As the parts are set in Figure 3, the normal direction of rotation of the rotor 11 is counterclockwise, as indicated by the arrow. Under these conditions the drum 32 will be weighted, or otherwise biased, to urge the cam member 22 to move in a clockwise direction. A weight 49 is illustrated in Figure 2 for biasing the cam member 22 into engagement with the extremity of the thumbscrew 48. Said weight 49 may be applied to the drum 32 at either side of the vertical axial plane of the drum 32, and for this purpose said weight is provided with a pair of bosses 50—50 adapted to receive cap screws 51—51, adapted to be threaded into holes 52—52 at diametrically opposed regions in said drum 32.

Figure 6 illustrates certain structural changes from the structure above described. According to Figure 6, the drum 32, instead of being directly connected to the cam member 22, is gear-connected to said cam member 22. According to the embodiment of the invention illustrated in Figure 6, a speed reduction train of gears is provided, whereby rotation of drum 32 through a predetermined arc will cause the movement of the cam member 22, and consequently the brush holder 13, through a smaller arc. Referring to Figure 6, it will be noted that the upper arm 16 is provided with a bearing 53 for supporting a stub shaft 54. Secured to the outer extremity of said stub shaft 54 is the gear 55, meshing with the gear 56 secured to the shaft 19. Secured to the inner extremity of the stub shaft 54 is the pinion 57, which meshes with the gear 58, which gear 58 is non-rotatably secured to the brush holder 13. Said brush holder 13 and the cam member 22 are non-rotatably secured together, just as in the embodiment illustrated in Figures 1 to 5, inclusive. Assuming that the motor illustrated is an alternating current commutator type motor, the brushes 14—14 would be short-circuited. It will be understood, of course, that though an alternating current commutator type motor is described, this particular type of motor is chosen only for convenience of description, the invention being applicable to other types of motor. In other language, the invention is applicable to any motor having series characteristics which may have its speed varied by shifting of its brushes.

The mode of operation of the above described embodiment of the present invention is substantially as follows. By reason of the adjustability of the brush holder 13 relative to the relatively stationary bearing ring 17, a relatively coarse adjustment is provided for the brushes 14—14 to produce the desired speed of rotation under load. By adjusting the thumbscrew 48, the position of the cam member 22 may be adjusted, whereby a relatively fine adjustment of the brushes 14—14 may be had for normal working condition, that is—loaded condition. The centrifugal device 36 will be so calibrated that when a predetermined speed higher than normal operating speed is attained, said centrifugal device will operate to cause frictional engagement between the linings 34—34 of the shoes 35—35 thereof and the inner peripheral surface 33 of the drum 32. The clearance between the centrifugal device 36 and the drum 32 will in practice be chosen of small value, whereby there will be no sudden jerks applied to said drum 32. Rotation of the drum 32 is communicated to the cam member 22 either directly, as in the structure shown in Figures 1 to 5, or through the gears 56, 55, 57 and 58 in the embodiment illustrated in Figure 6. Rotary movement of the drum 32 will be in opposition to the biasing effect of the weight 49, which weight 49 tends to hold the cam member 22 in engagement with the extremity of the thumbscrew 48. Such movement of the cam member 22 will result in the shifting of the brushes in the direction of rotation, which will have the effect of holding down the motor speed. By reason of this arrangement, the idling speed of the motor is held at a predetermined value.

Though certain preferred embodiments of the present invention have been described in detail, it will be understood that many modifications will occur to those skilled in the art. It is intended to cover all such modifications that fall within the scope of the appended claims.

What is claimed is—

1. In combination, an alternating current electric motor having series characteristics, said motor having a commutator and brushes cooperatively associated with said commutator, biasing means for said brushes, adjustable means for limiting the action of said biasing means, and speed responsive means for shifting said brushes to limit the speed of said motor.

2. In combination, an electric motor having series characteristics, said motor having a commutator and shiftable brushes cooperatively associated with said commutator, means biasing said brushes to a predetermined position, adjustable means for varying said predetermined positions, and means for clutching the rotor of said motor to said brushes, said clutching means comprising a speed responsive driving member connected to said rotor and a driven member connected to said brushes.

3. In combination, an electric motor having a commutator and brushes, the shifting of which brushes controls the speed of said motor, a yoke for said motor, said motor having a rotor shaft, anti-friction bearings cooperating with said yoke and said shaft, a member carried by said yoke, said member being connected to said brushes, an adjustable stop for said member, said member being biased in a direction to hold said member against said adjustable stop, and speed controlled means for moving said member away from said adjustable stop to shift said brushes to limit the speed of said rotor shaft 4. In combination, an electric motor having a commutator and brushes, the shifting of which brushes controls the speed of said motor, a yoke for said motor, said motor having a rotor shaft, anti-friction bearings cooperating with said yoke and said shaft, a member carried by said yoke, said member being connected to said brushes, an adjustable stop for said member, said member being biased in a direction to hold said member against said adjustable stop, a drum connected to said cam member, and means connected to said rotor shaft for clutching said rotor shaft to said drum when the speed of said rotor shaft has increased to a predetermined value.

5. In combination, an electric motor having a commutator and brushes associated with said commutator, the speed of said motor being responsive to the position of said brushes, brush holding means for said brushes, said motor having a rotor shaft and having a yoke providing a bearing ring, anti-friction bearings between said bearing ring and said shaft, rotatable means carried by said bearing ring, and speed responsive means for controlling said rotatable means, said brush holding means including a split sleeve rotarily adjustably carried by said rotatable means.

6. In combination, an electric motor having a commutator and brushes associated with said commutator, the speed of said motor being responsive to the position of said brushes, brush holding means for said brushes, said motor having a rotor shaft and having a yoke providing a bearing ring, anti-friction bearings between said bearing ring and said shaft, rotatable means carried by said bearing ring, and speed responsive means for controlling said rotatable means, said brush holding means including a split sleeve rotarily adjustably carried by said rotatable means, said rotatable means being biased to a predetermined position and having cooperatively associated therewith adjustment means for adjusting said predetermined biased position.

7. In combination, an electric motor having a commutator and brushes associated with said commutator, the speed of said motor being responsive to the position of said brushes, brush holding means for said brushes, said motor having a rotor shaft and having a yoke providing a bearing ring, anti-friction bearings between said bearing ring and said shaft, rotatable means carried by said bearing ring, and speed responsive means for controlling said rotatable means, said brush holding means including a split sleeve rotarily adjustably carried by said rotatable means, said rotatable means being biased to a predetermined position and having cooperatively associated therewith adjustment means for adjusting said predetermined biased position, said speed responsive means including clutching means, the driven member of which is connected to said rotatable means and the driving member of which is connected to the rotor of said motor and adapted to clutch said driven member when the speed of said shaft reaches a predetermined value.

8. In combination, a motor having a commutator and brushes associated with said commutator, the speed of said motor being responsive to the positions of said brushes, adjustable means for setting said brushes for predetermined load conditions, and means for shifting said brushes, said shifting means including clutching means, the driven member of said clutching means being connected to said brushes, the driving member of said clutching means including speed responsive means for rendering said clutching means operative when the speed of said motor reaches a predetermined value.

9. In combination, a motor adapted for operation under alternating loaded and unloaded conditions, said motor having a commutator and brushes and being of a type which has its speed controlled by the shifting of said brushes, adjustable means for yieldably predetermining the setting of said brushes for loaded conditions, and means for limiting the speed of said motor under unloaded conditions, said limiting means including clutching means, the driven member of said clutching means being connected to said brushes, the driving member of said clutching means being connected to the rotor of said motor for rendering said clutching means operative when a predetermined speed under unloaded conditions is attained.

Signed at Chicago, Illinois, this 1st day of October, 1928.

JOHN D. NIES.